United States Patent [19]
James et al.

[11] Patent Number: 5,827,597
[45] Date of Patent: *Oct. 27, 1998

[54] TOPOGRAPHICAL SUPPORT MEMBER FOR PRODUCING NONWOVEN FABRICS

[75] Inventors: William A. James, Long Branch; William G. F. Kelly, Middlesex, both of N.J.

[73] Assignee: McNeil-PPC, Inc., Skillman, N.J.

[*] Notice: The term of this patent shall not extend beyond the expiration date of Pat. No. 5,674,587.

[21] Appl. No.: 671,229

[22] Filed: Jun. 27, 1996

Related U.S. Application Data

[60] Division of Ser. No. 307,203, Sep. 16, 1994, Pat. No. 5,585,017, which is a continuation-in-part of Ser. No. 131,191, Sep. 13, 1993, abandoned.

[51] Int. Cl.⁶ .................................. D04H 1/46; B32B 3/24
[52] U.S. Cl. .............................. 428/131; 428/156; 28/104; 28/105; 28/106
[58] Field of Search .................................... 428/131, 156; 28/104, 105, 106

[56] References Cited

U.S. PATENT DOCUMENTS

| | | | |
|---|---|---|---|
| 4,342,314 | 8/1982 | Rudel et al. | 128/287 |
| 4,995,151 | 2/1991 | Siegel et al. | 28/169 |
| 5,098,764 | 3/1992 | Drelich et al. | 428/131 |
| 5,158,819 | 10/1992 | Goodman, Jr. et al. | 428/131 |

*Primary Examiner*—William Watkins

[57] ABSTRACT

A topographical support member and method of forming a topographical support member for use in producing nonwoven fabrics, especially tricot-like nonwoven fabrics. The topographical support member includes a body having a top surface comprising a pattern of a plurality of peaks and valleys and a plurality of apertures. The apertures have a conical top portion that is surrounded by a cluster of the peaks and valleys. The center line to center line spacing of adjacent apertures is less than the major diameter of the conical top portion of the apertures. The topographical support member is formed by focusing a laser beam so that the focal point is below the top surface of a starting workpiece and drilling with the laser beam the predetermined pattern of tapered apertures. The pattern of tapered apertures forms the cluster of peaks and valleys surrounding each aperture on the top surface of the resulting support member.

4 Claims, 10 Drawing Sheets

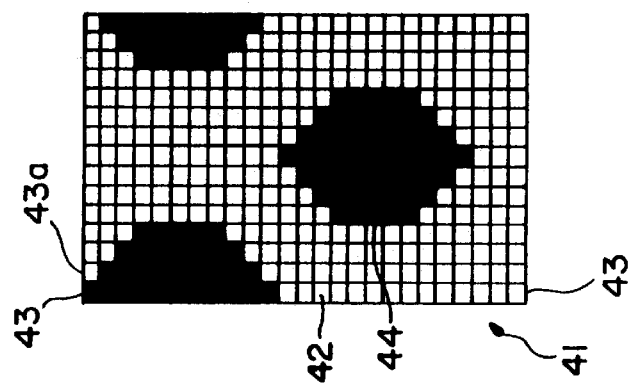
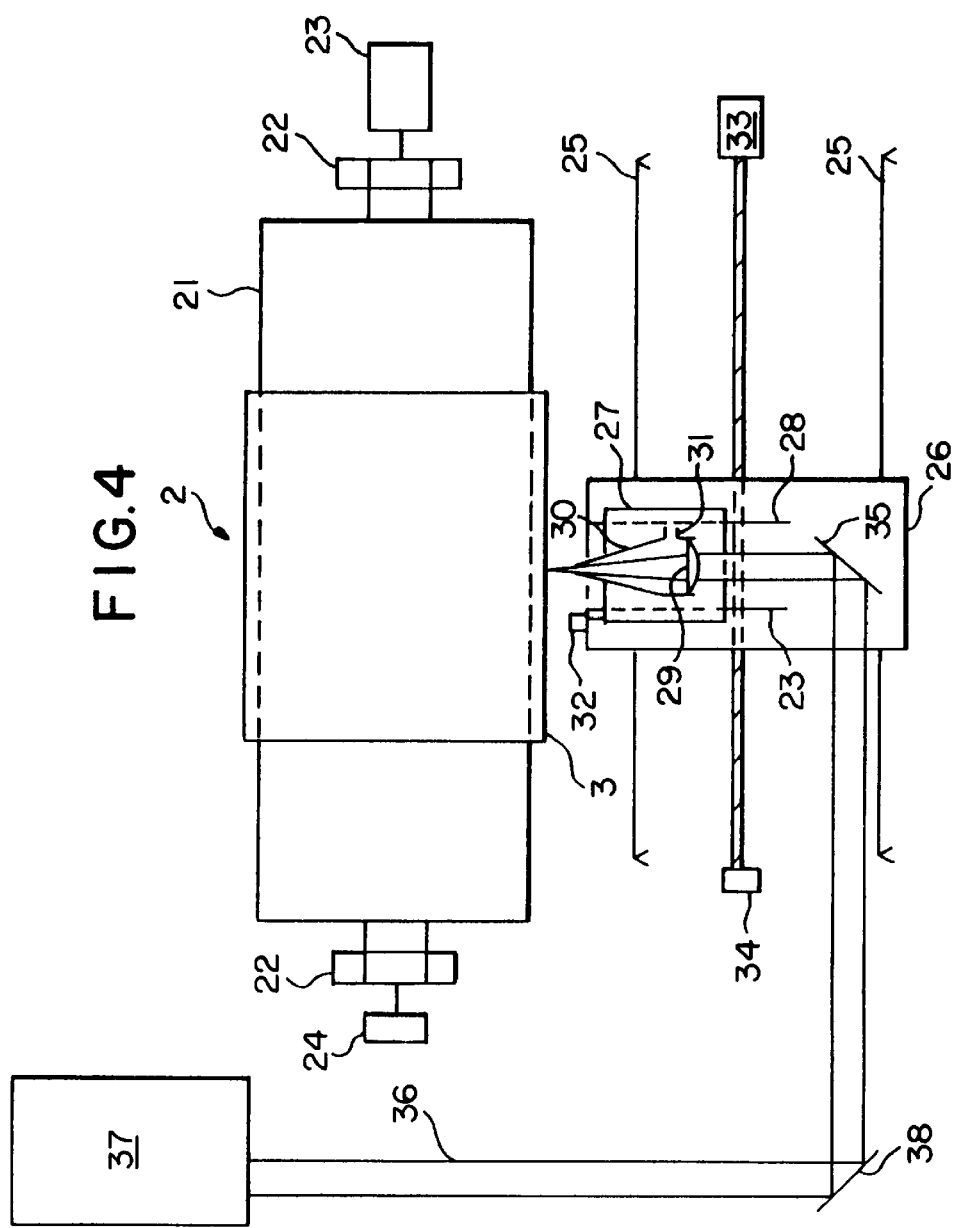

TOPOGRAPHICAL SUPPORT MEMBER FOR PRODUCING NONWOVEN FABRICS

RELATED APPLICATIONS

This application is a divisional application of commonly assigned U.S. application Ser. No. 307,203, filed Sep. 16, 1994, now U.S. Pat. No. 5,585,017 which is a continuation-in-part of commonly assigned U.S. application Ser. No. 131,191, filed Sep. 13, 1993 abandon.

BACKGROUND OF THE INVENTION

Nonwoven fabrics have been known for many years. In one process for producing nonwoven fabrics, a fiber batt or web is treated with water streams to cause the fibers to entangle with each other and provide some strength in the batt. Many methods have been developed for treating fiber batts in this manner in an attempt to duplicate the physical properties and appearance of woven fabrics.

U.S. Pat. Nos. 5,098,764 and 5,244,711 disclose backing members for supporting a fibrous web during the manufacture of nonwoven fabrics. The support members disclosed in U.S. Pat. No. 5,098,764 have a predetermined topography as well as a predetermined pattern of openings within that topography. In one specific embodiment, the backing member is three-dimensional and includes a plurality of pyramids disposed in a pattern over one surface of the backing member. This specific backing member further includes a plurality of openings which are disposed in the spaces, referred to as "valleys", between the aforementioned pyramids. In this process, a starting web of fiber is positioned on the topographical support member. The support member with the fibrous web thereon is passed under jets of high pressure fluid, typically water. The jets of water cause the fiber to intertwine and interentangle with each other in a particular pattern, based on the topographical configuration of the support member.

The pattern of topographical features and apertures in the support member is critical to the structure of the resulting nonwoven fabric. In addition, the support member must have sufficient structural integrity and strength to support a fibrous web while fluid jets rearrange the fibers and entangle them in their new arrangement to provide a stable fabric. The support member must not under go any substantial distortion under the force of the fluid jets. Also, the support member must have means for removing the relatively large volumes of entangling fluid so as to prevent "flooding" of the fibrous web, which would interfere with effective entangling. Typically, the support member includes drainage apertures which must be of a sufficiently small size to maintain the integrity of the fibrous web and prevent the loss of fiber through the forming surface. In addition, the support member should be substantially free of burrs, hooks or the like irregularities that could interfere with the removal therefrom of the entangled fabric. At the same time, the support member must be such that fibers of the fibrous web being processed thereon are not washed away under the influence of the fluid jets.

While machining may be used to fabricate such topographical support members, such a method of manufacture is extremely expensive and often results in aforementioned burrs, hooks and irregularities. Thus, there is a need for a method for making topographical support members which method is less expensive and reduces the numbers of burrs, hooks and irregularities therein.

SUMMARY OF THE INVENTION

The present invention is directed to a method of forming a topographical support member for producing nonwoven fabrics and to the topographical support member formed by the method of the invention which can be used to produce tricot-like or other similar nonwoven fabrics. In accordance with the method of the present invention, a laser beam is directed onto a workpiece to be engraved with a topographical pattern. The laser beam is focused such that the focal point of the beam is below the top surface of the workpiece. The focusing of the laser beam at a point other than the top surface of the workpiece, e.g. at a point below the top surface, instead of on the surface is termed "defocusing." Thereafter, the defocused laser beam is used to drill a predetermined pattern of tapered apertures in the workpiece in such a manner to form a topographical array of peaks and valleys surrounding each aperture of the workpiece. The apertures have a tapered or conical-like top portion angled such that the major diameter of the aperture resides on the top surface of the resulting support member. The topographical array of peaks and valleys is formed by the center line to center line spacing of adjacent apertures being less than the major diameter of the top portion of the apertures. Such a spacing results in the taper of adjacent apertures intersecting within the starting thickness of the workpiece.

In one embodiment, a raster scan laser drilling process is used to form the topographical support member. In this embodiment, the laser beam is moved in a series of raster scans over the surface of the workpiece. During each scan, the laser is turned on at predetermined intervals of sufficient time and intensity to drill one or more discrete portions of each of the apertures. In this method, each aperture will take a multiplicity of scans to be drilled in its entirety. In one embodiment, the pattern of the plurality of peaks, valleys and apertures is configured to produce a nonwoven fabric having the appearance of a tricot knit fabric.

BRIEF DESCRIPTION OF THE DRAWINGS

FIG. 4 is a diagrammatic view of an apparatus for forming a topographical support member of the present invention.

FIG. 5 depicts the smallest rectangular repeat element, 25 pixels long and 15 pixels wide, of the pattern shown in FIG. 3.

DETAILED DESCRIPTION OF THE INVENTION

Figure 1:
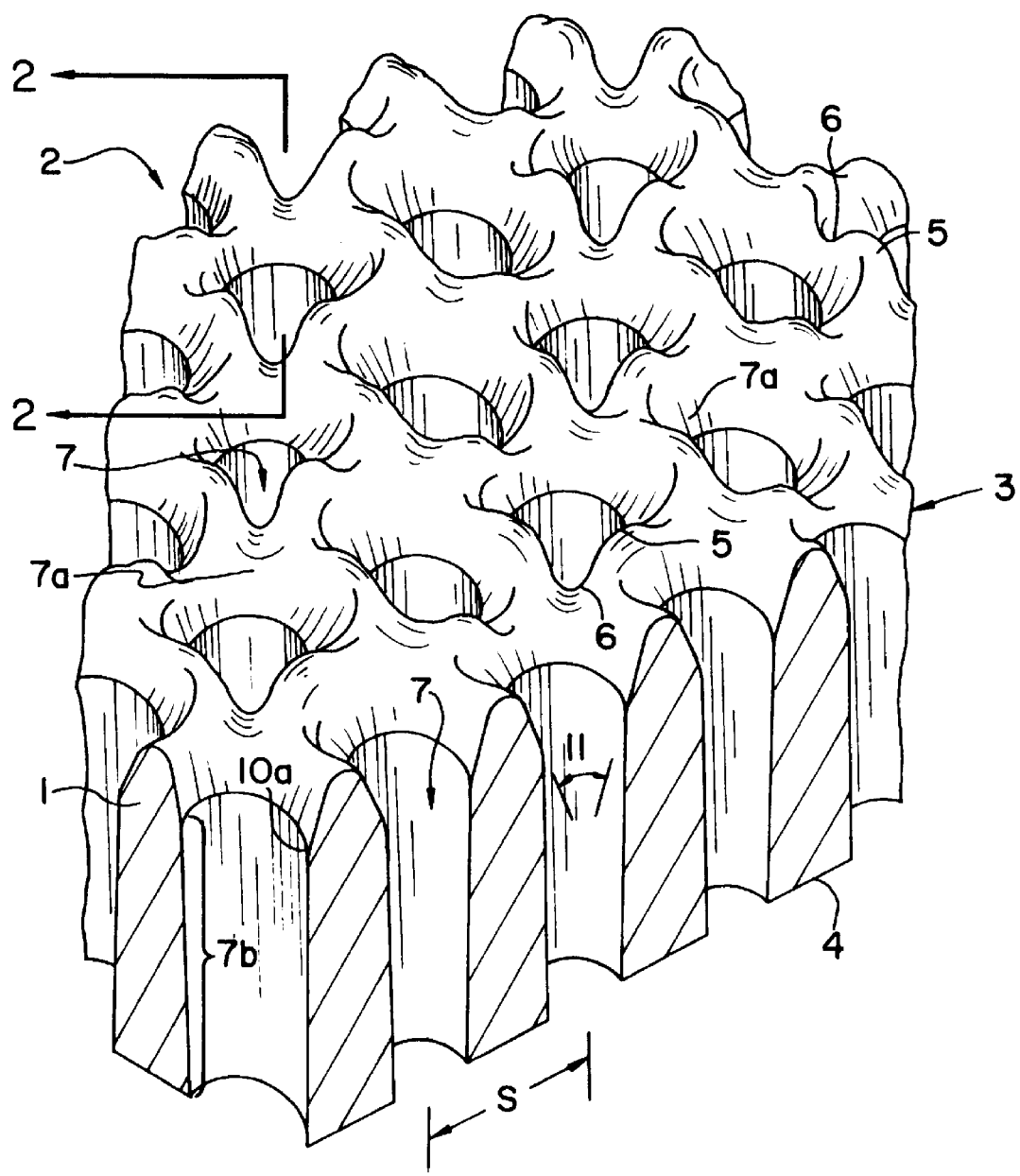
FIG. 1 is a perspective view of one type of topographical support member of the present invention.

Referring now to the drawings, a topographical support member of the present invention is shown in perspective in FIG. 1.

The support member 2 comprises a body 1 having a top surface 3 and bottom surface 4. Disposed in a predetermined pattern across top surface 3 is an array of peaks 5 separated by valleys 6. A plurality of drainage apertures 7 extending through the thickness of the support member are disposed in a pattern in the member 2. In this embodiment, each drainage aperture 7 is surrounded by a cluster of six peaks 5 and six valleys 6.

Drainage aperture 7 comprises an upper portion 7a and a lower portion 7b. As can be seen in FIG. 1, upper portion 7a of aperture 7 comprises a wall 10 and is generally "bell-mouthed" or "flared" in configuration. Upper portion 7a is tapered, having a cross-sectional area which is larger nearer the top surface of support member 2 and a cross-sectional area which is smaller at the point 10a where the bottom of said upper portion meets the top of lower portion 7b. Lower portion 7b, in the specific embodiment under discussion, has a somewhat tapered cylindrical configuration. The cross-sectional area of lower portion 7b of aperture 7 is greater at point 10a then at the bottom surface 4 of the support member. An aperture 7 is shown in cross-section in FIG. 2. Lines 9 are drawn tangent to opposed points on walls 10 one hole radius below top surface 3. The angle 11 formed by lines 9 must be controlled relative to the thickness 12 of the support member 2 to produce the intended result. For example, if the angle is too great, the aperture will be too small and therefore insufficient drainage will be provided. If the angle is too small, there will be very few or no peaks and valleys.

Figure 13:
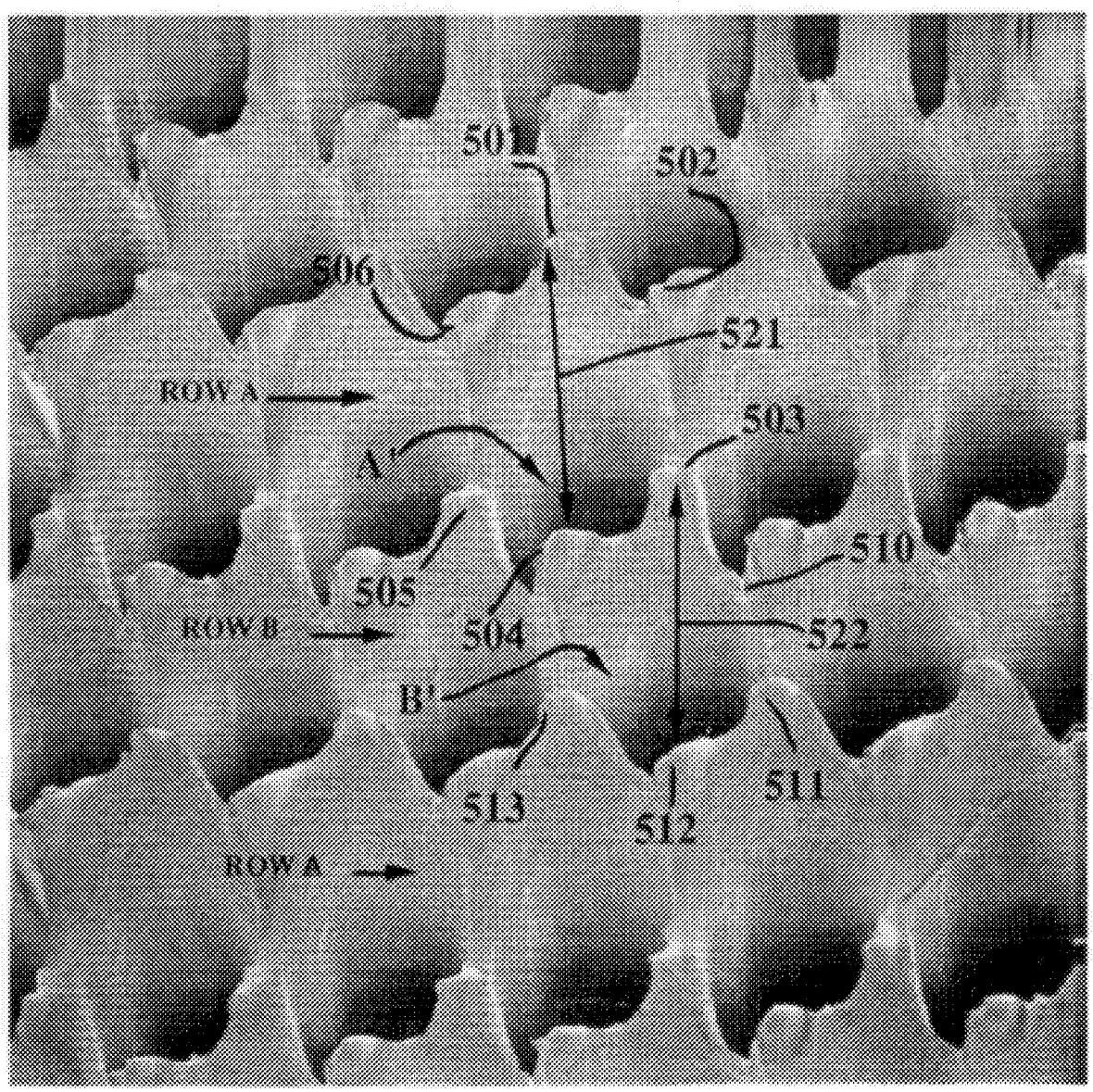
FIG. 13 is a digitized image of a support member of the present invention from a scanning electron microscope.

The center-to-center spacing, S, of adjacent apertures (See FIG. 1) in the repeating pattern is of similar importance. The peaks 5 and valleys 6 are created by the intersection of the tapered somewhat conical apertures 7. If the center-to-center spacing of the apertures were greater than the major diameter of aperture 7 at the top surface 3, no intersection would result, and the member would be a smooth, flat top surface with conical apertures disposed throughout. Referring to FIG. 13, the major diameter of aperture A' extends between peaks 501 and 504 and is identified by double-headed arrow 521. Similarly, the major diameter of aperture B' extends between peaks 503 and 512 and is identified by double-headed arrow 522. The major diameter of a given aperture is the largest peak-to-peak distance, measured at the top surface of the support member, between any pair of peaks defining the upper portion of the aperture. When the center-to-center spacing of adjacent apertures is less than the aperture diameters measured along that center-to-center line, the conical surfaces intersect forming a valley.

Figure 3:
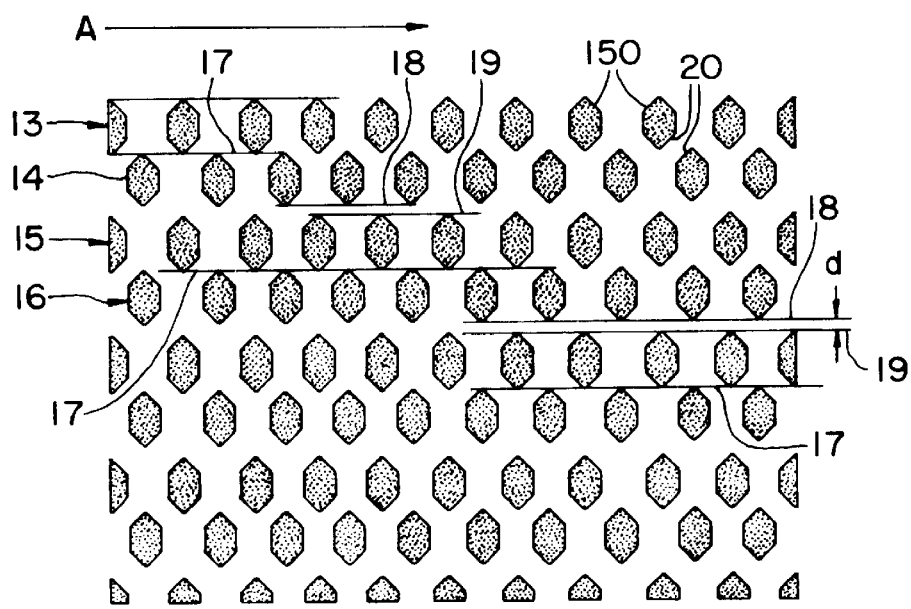
FIG. 3 is a bit map of the laser instructions defining a pattern of apertures to be drilled in a workpiece to form the topographical support member of FIG. 1.

Referring now to FIG. 3, apertures 7 are depicted as hexagons in a nested array, but the invention is not limited to hexagons. Other shapes, such as for example circles, squares, octagons, or irregular shapes (See FIGS. 12), or combinations thereof, may be used, depending on the desired topographical configuration.

Rows 13 and 14, running parallel to directional arrow A in FIG. 3, each comprise a plurality of hexagons 150. These hexagons are 7 pixels wide, 11 pixels long and within each row are spaced 8 pixels apart. Row 13 of hexagons is spaced closely to row 14 of hexagons. Specifically, as can be seen in FIG. 3, the lower tip of each hexagon in row 13 is tangent to line 17, which line 17 is also tangent to the upper tip of each hexagon in row 14. Rows 15 and 16 duplicate the pattern and spacing of rows 13 and 14. The spacing between rows 15 and 16 corresponds substantially to the above-mentioned spacing between rows 13 and 14. Row 15, however, is spaced from row 14. As seen in FIG. 3, the lowermost tips of the hexagons in row 14 are tangent to line 18, while the uppermost tips of the hexagons in row 15 are tangent to line 19. Lines 18 and 19 are spaced from each other by a distance, d, which in the pattern illustrated in FIG. 3, is 3 pixels. The above-described pattern of the rows 13, 14, 15 and 16 is repeated throughout the bit map of FIG. 3. It will be understood that the spacing of the hexagons may be non-uniform within a given row or between adjacent rows.

The distance between parallel adjacent walls 20 of two adjacent hexagons shown in the bit map of FIG. 3 must be sufficient to give the support member strength to resist the fluid forces and allow normal handling.

Referring to FIG. 1, each aperture 7 is surrounded by six adjacent apertures 7. If all of these apertures 7 have sufficient taper to create diameters greater than their respective center-to-center spacing, each aperture 7 will have six intersections with its neighbors, and these intersections will produce six valleys 6.

Depending on their depth, these valleys 6 can either intersect the top surface 3, resulting in their being separated by small plateaus, or they can intersect each other and produce a peak 5.

The apparatus of the present invention used to produce topographical support members is shown in FIG. 4. The starting material for the support member may be any desired shape or composition. The topographical support member preferably comprises acetal; acrylic will also perform satisfactorily. In addition, the preferred shape of the starting material is a thin wall, cylindrical, preferably seamless, tube that has been relieved of residual internal stresses. As will be described later, the cylindrical shape accommodates the preferred apparatus for producing the nonwoven fabrics.

Tubes manufactured to date for use in forming support members are 2 to 6 feet in diameter and have a length ranging from 2 to 16 feet. The wall thickness is nominally ¼ inch. These sizes are a matter of design choice.

A starting blank tubular workpiece is mounted on an appropriate arbor, or mandrel 21 that fixes it in a cylindrical shape and allows rotation about its longitudinal axis in bearings 22. A rotational drive 23 is provided to rotate mandrel 21 at a controlled rate. Rotational pulse generator 24 is connected to and monitors rotation of mandrel 21 so that its precise radial position is known at all times.

Parallel to and mounted outside the swing of mandrel 21 is one or more guide ways 25 that allow carriage 26 to traverse the entire length of mandrel 21 while maintaining a constant clearance to the top surface 3 of tube 2. Carriage drive 33 moves the carriage along guide ways 25, while carriage pulse generator 34 notes the lateral position of the carriage with respect to support member 2. Mounted on the carriage is focusing stage 27. Focusing stage 27 is mounted in focus guide ways 28 and allows motion orthogonal to that of carriage 26 and provides a means of focusing lens 29 relative to top surface 3. Focus drive 32 is provided to position the focusing stage 27 and provide the focusing of lens 29.

Secured to focusing stage 27 is the lens 29, which is secured in nozzle 30. Nozzle 30 has means 31 for introducing a pressurized gas into nozzle 30 for cooling and maintaining cleanliness of lens 29.

Also mounted on the carriage 26 is final bending mirror 35, which directs the laser beam 36 to the focusing lens 29. Remotely located is the laser 37, with optional beam bending mirrors 38 to direct the beam to final beam bending mirror 35. While it would be possible to mount the laser 37 directly on carriage 26 and eliminate the beam bending mirrors, space limitations and utility connections to the laser make remote mounting far preferable.

When the laser 37 is powered, the beam 36 emitted is reflected first off beam bending mirror 38, then final beam bending mirror 35, which directs it to lens 29. The path of laser beam 36 is configured such that, if lens 29 were removed, the beam would pass through the longitudinal center line of mandrel 21.

With lens 29 in position, the beam is focused below, but near the top surface 3. Focusing the beam below the top surface is identified as "defocusing" the laser beam relative to the surface of the tube.

While this invention could be used with a variety of lasers, the preferred laser is a fast flow $CO_2$ laser, capable of producing a beam rated at up to 2500 watts. This process is in no way dependent on such a high power laser, as support surfaces have been successfully drilled with a slow flow $CO_2$ laser rated at 50 watts.

When focusing lens 29 passes beam 36, it concentrates the energy near the center of the beam. The rays are not bent through a single point, but rather a spot of small diameter. The point of smallest diameter is said to be the focus or focal point. This occurs at a distance from the lens said to be the focal length. At lengths either shorter or greater than the focal length, measured spot sizes will be greater than the minimum.

The sensitivity to focus position is inversely proportional to focal length. Minimum spot size is directly proportional to focal length. Therefore, a short focal length lens can achieve a smaller spot size but must be more accurately positioned and is affected dramatically by surface run-out. Longer focal length lenses are more forgiving of target positioning, but can only achieve somewhat larger spot sizes. Thus, in addition to the power distribution contributing to the tapered top portion of the drilled aperture, the defocusing of the beam below the surface also contributes to the angle and length of the taper, and hence the shape and size of the peaks and valleys.

In order to fabricate a support member, an initial focusing step must be performed. Once a blank tubular workpiece 2 is positioned on the mandrel 21, the laser is pulsed briefly and the mandrel rotated slightly between pulses such that a series of small depressions is produced. The focus stage 27 is then moved with respect to the mandrel center line to change the focus position and another series of depressions is produced. Typically a matrix of 20 rows of 20 depressions each is drilled. The depressions are examined microscopically, and the column of smallest depressions identified. This is established as the reference diameter for top surface 3 of the blank tubular workpiece at which the beam was focused.

A desired pattern is selected, such as the one shown in FIG. 3. The pattern is examined to determine the number of repeats that will be required to cover the circumference of the workpiece and complete the surface without an obvious seam. Similarly, the advance along the longitudinal axis of the tubular workpiece per repeat and total number of repeats is established. These data are entered into a computer control for operating the laser drilling machine.

Figure 2:
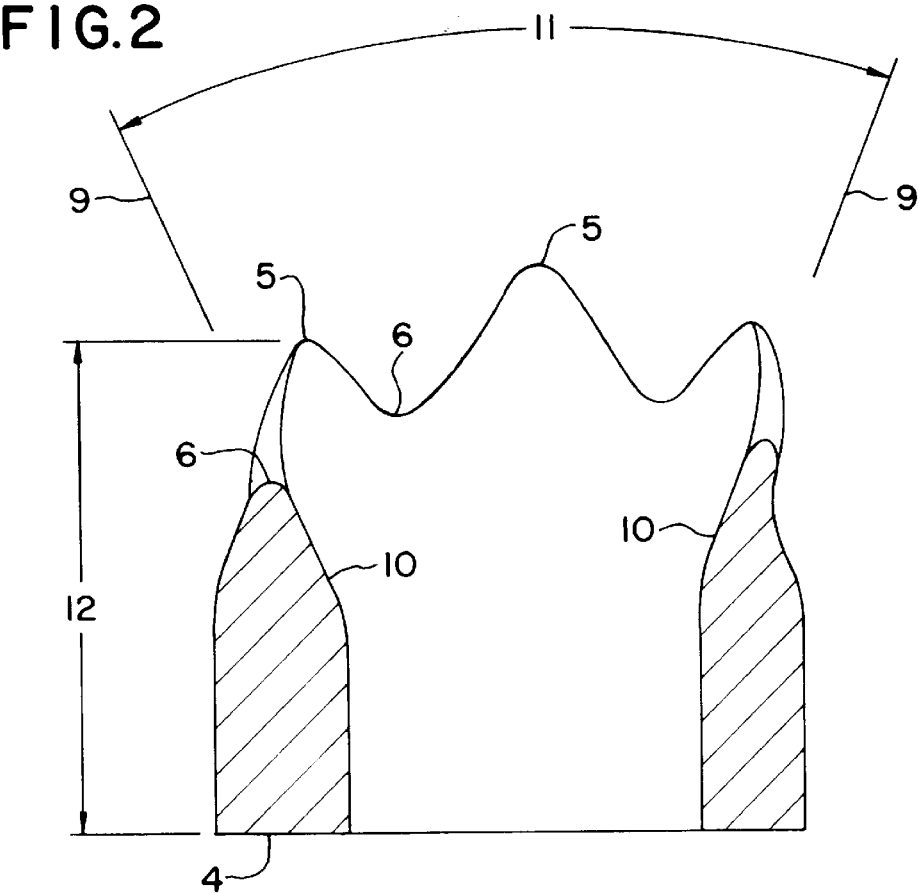
FIG. 2 is a cross-sectional view taken along lines 2—2 of FIG. 1.

In operation, the mandrel, with the tubular workpiece mounted thereon, is rotated in front of the lens. The carriage is motored so that the first aperture position corresponds with the focal point of the lens 29. The focus stage is motored inward, placing the focal point inside the interior of the material to be drilled. The laser is then pulsed, with some combination of pulse power level and duration. As seen in FIG. 2, the diameter of the aperture at the top surface 3 is considerably larger than the diameter of the aperture at the lower surface 4. In order to achieve the desired topographical configuration, two factors need to be measured and controlled. First, the degree with which the lens is focused into the interior of the workpiece increases the cone angle 11, and second, increasing the power level or pulse duration increases the depth and diameter. Once an aperture of the proper diameter and taper is achieved, the rotational drive and carriage drive can be indexed to reposition the support member such that the next intended hole position corresponds to the focal point. The process is then repeated until the entire pattern has been drilled. This technique is known as "percussion" drilling.

If the laser selected is of sufficient power, the mandrel and carriage do not need to be stopped during the laser pulse. The pulse can be of such short duration that any movement of the workpiece during the drilling process is inconsequential. This is known in the trade as "fire-on-the-fly" drilling.

If the laser can recover rapidly enough, the workpiece can be rotated at a fixed speed and the laser pulsed once to create each hole. In a pattern such as the one shown in FIG. 3, the laser would normally be pulsed to produce a complete column, the carriage indexed to the next column position and the beam pulsed for the next series of apertures.

One problem that may occur depending on the type of material and density of the pattern of apertures, is the introduction of a large amount of heat into a small area of the forming surface. Gross distortion, and the loss of pattern registration may result. Under some conditions, major dimensional changes of the part results, and the surface is neither cylindrical nor the right size. In extreme cases, the tube may crack.

A preferred embodiment of the present invention, which eliminates this problem, uses a process called defocused raster scan drilling.

In this approach, the pattern is reduced to the smallest rectangular repeat element 41 as depicted in FIG. 5. This repeat element contains all of the information required to produce the pattern in FIG. 3. When used like a tile and placed both end-to-end and side-by-side, the larger pattern is the result.

This repeat element is further divided into a grid of smaller rectangular units or "pixels" 42. Though typically square, for some purposes, it is more convenient to employ pixels of unequal proportions.

Each column of pixels represents one pass of the workpiece past the focal position of the laser. This column is repeated as many times as is required to reach completely around support member 2. Each pixel where the laser is intended to create a hole is black. Those pixels where the laser is turned off are white.

To begin drilling at the top of the first column of pixels in FIG. 5, while the mandrel is turning at a fixed rate, the laser is turned on, maintained at a constant power level for 11 pixels and then switched off. These pixels are counted by the rotational pulse generator 24 in FIG. 4. The laser remains off for the next 14 units. This laser off/on sequence is repeated for the first revolution, at which point the mandrel is back to starting position, carriage drive 33 has repositioned the carriage one unit and the computer is ready to do column 43a.

During column number 43a, the laser has a shorter "on time" (now 9 units) and longer "off time" (now 16 units). The total number of on and off times is a constant based on the pattern height.

This process is repeated until all of the columns have been used over an entire revolution each; in the case of FIG. 5, there were 15 revolutions of the mandrel. At this point, the process returns to the instructions in column 43.

Note that in this approach, each pass produces a number of narrow cuts in the material, rather than a large hole. Because these cuts are precisely registered to line up side-by-side and overlap somewhat, the cumulative effect is a hole. In the pattern of FIG. 5, each hexagonal hole 44 actually requires 7 passes separated by a complete revolution, distributing the energy around the tube and minimizing local heating.

If, during this drilling operation, the lens was focused at the top surface of the material, the result would be hexagonal holes with reasonably parallel walls. The combination of raster scan drilling with the defocused lens approach, however, produces the forming surface of FIG. 1.

In the present invention, the apertures 7 are quite small and numerous. Typical patterns range from 800 to 1400 apertures per square inch.

The process to manufacture a nonwoven fabric using a support member of the present invention has been described in U.S. Pat. Nos. 5,098,764 and 5,244,711, both of which are incorporated by reference herein.

Figure 6:
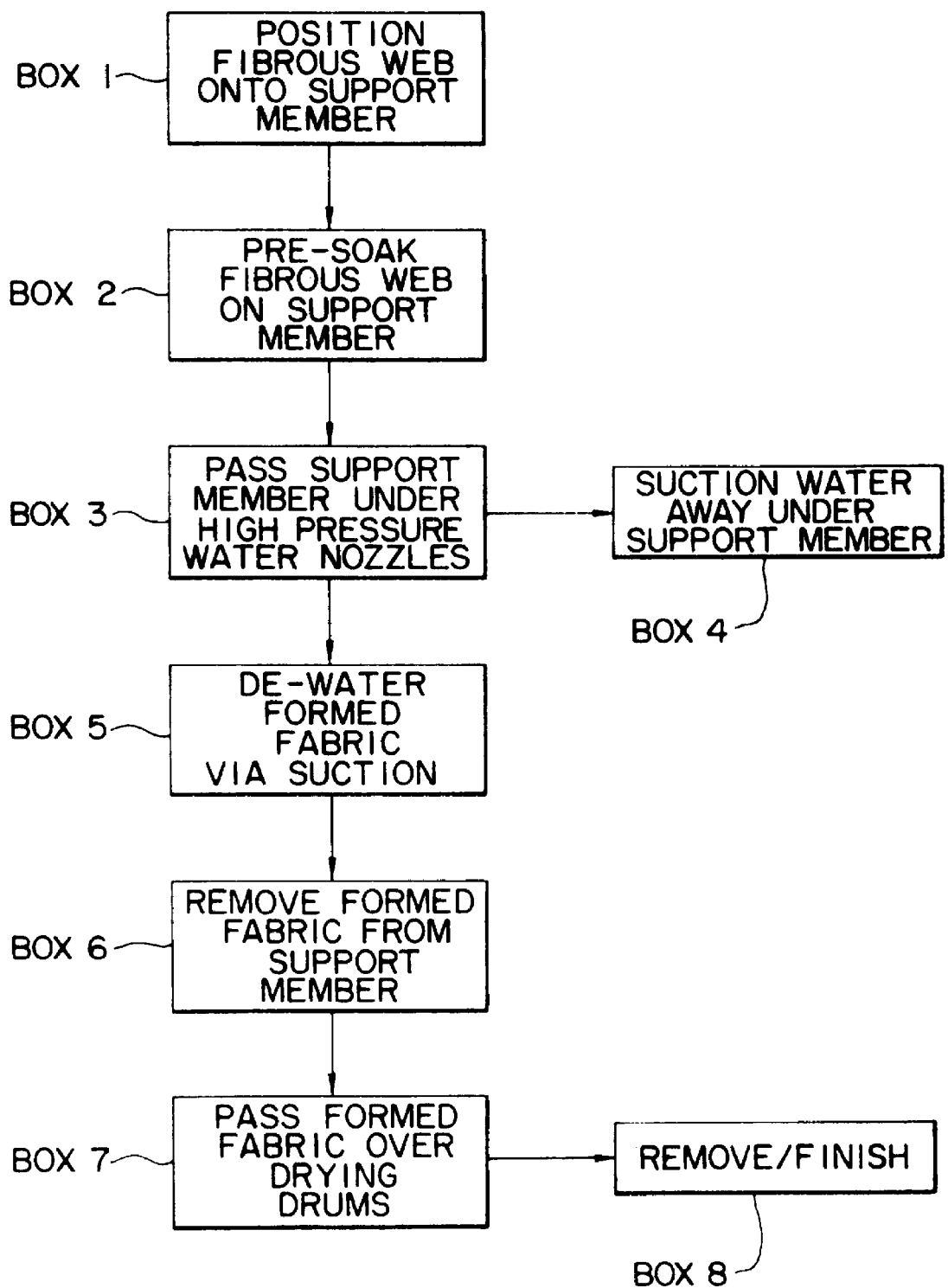
FIG. 6 is a block diagram showing the various steps of the process of producing nonwoven fabrics using a support member of the present invention.
Figure 7:
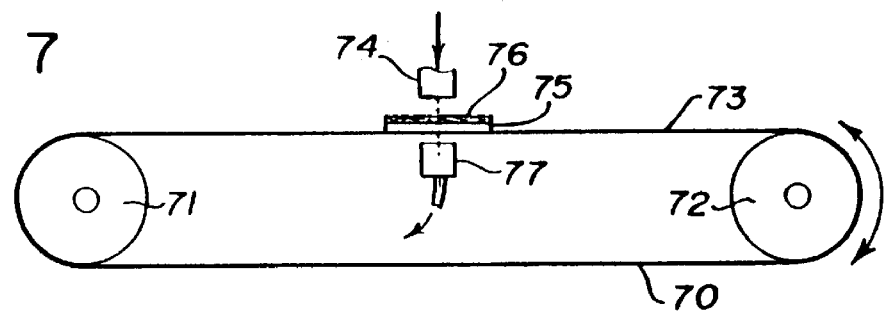
FIG. 7 is a schematic sectional view of one type of apparatus for producing nonwoven fabrics using a support member of the present invention.

FIG. 6 is a block diagram showing the various steps in the process of producing the novel nonwoven fabrics of the present invention. The first step in this process is to position a web of fibers on a topographical support member (Box 1). The fibrous web is presoaked or wetted out while on this support member (Box 2) to ensure that as it is being treated it will remain on the support member. The support member with the fibrous web thereon is passed under high pressure fluid ejecting nozzles (Box 3). The preferred fluid is water. The water is transported away from the support member, preferably using a vacuum (Box 4). The fibrous web is de-watered (Box 5). The de-watered formed fabric is removed from the support member (Box 6). The formed fabric is passed over a series of drying drums to dry the fabric (Box 7). The fabric may then be finished or otherwise processed as desired (Box 8). FIG. 7 is a schematic representation of one type of apparatus for carrying out the process and producing the fabrics of the present invention. In this apparatus, a foraminous conveyor belt 70 moves continuously about two spaced apart rotating rolls 71 and 72. The belt is driven so that it can be reciprocated or moved in either a clockwise or counterclockwise direction. At one position on the belt, in the upper reach 73 of the belt, there is placed above the belt a suitable water ejecting manifold 74. This manifold has a plurality of very fine diameter holes, of about $7/1000$ of an inch in diameter, with about 30 holes per inch. Water under pressure is driven through these holes. On top of the belt is placed a topographical support member 75 and on top of that topographical member the fiber web 76 to be formed is placed. Directly beneath the water manifold, but under the upper reach of the belt, is a suction manifold 77 to aid in removing the water and prevent flooding of the fiber web. Water from the manifold impinges on the fiber web, passes through the topographical support member and is removed by the suction manifold. As may be appreciated, the topographical support member with the fibrous web thereon may be passed under the manifold a number of times as desired to produce fabrics in accordance with the present invention.

Figure 8:
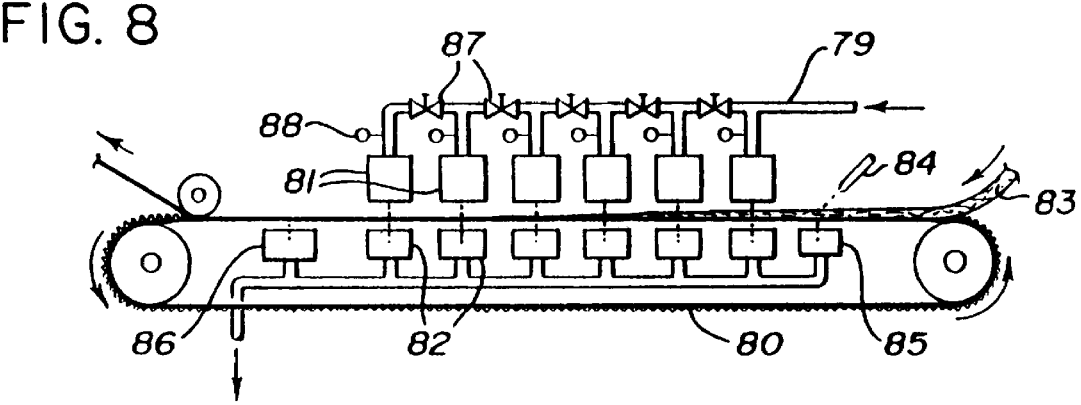
FIG. 8 is a diagrammatic view of another type of apparatus for producing nonwoven fabrics using a support member of the present invention.

In FIG. 8 there is depicted an apparatus for continuously producing fabrics in accordance with the present invention. This schematic representation of the apparatus includes a foraminous conveyor belt 80 which actually serves as the topographical support member in accordance with the present invention. The belt is continuously moved in a counterclockwise direction about spaced apart rotating rolls as is well known in the art. Disposed above this belt is a fluid feeding manifold 79 connecting a plurality of lines or groups 81 of orifices. Each group has one or more rows of very fine diameter holes with 30 or more holes per inch. The manifold is equipped with pressure gauges 88 and control valves 87 for regulating the fluid pressure in each one or group of orifices. Disposed beneath each orifice line or group is a suction member 82 for removing excess water, and to keep the area from flooding. The fiber web 83 to be formed into the nonwoven fabric of the present invention is fed onto the topographical support member conveyor belt. Water is sprayed through an appropriate nozzle 84 onto the fibrous web to pre-wet the web and aid in controlling the fibers as they pass under the pressure manifolds. A suction slot 85 is placed beneath this water nozzle to remove excess water. The fibrous web passes under the fluid feeding manifold with the manifold preferably having an increased pressure. For example, the first lines of holes or orifices may supply fluid forces at 100 psi, while the next lines of orifices may supply fluid forces at a pressure of 300 psi, and the last lines of orifices supply fluid forces at a pressure of 700 psi. Though six fluid supplying lines of orifices are shown, the number of lines or rows of orifices is not critical, but will depend on the weight of the web, the speed of operation, the fluid pressures used, the number of rows of holes in each line, etc. After passing between the fluid feeding and suction manifolds the formed fabric is passed over an additional suction slot 86 to remove excess water from the web.

Figure 9:
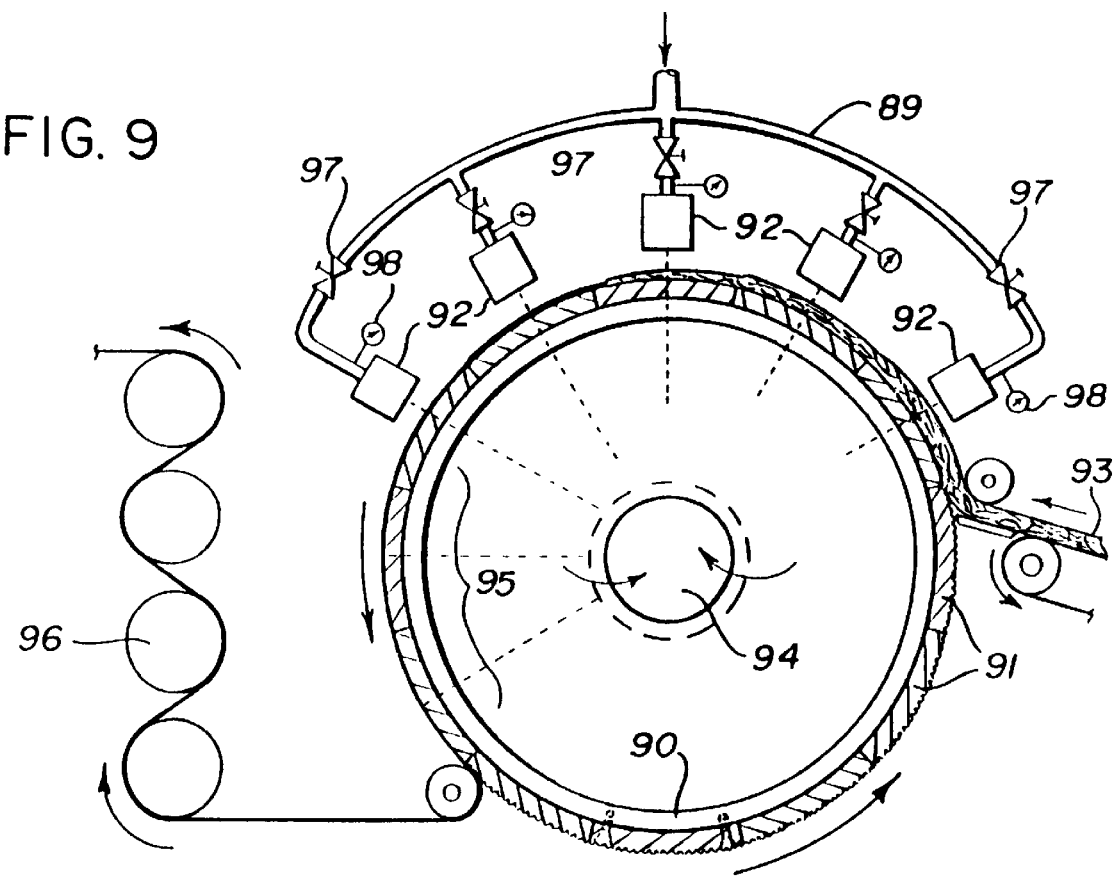
FIG. 9 is a diagrammatic view of a preferred type of apparatus for producing nonwoven fabrics using a support member of the present invention.

A preferred apparatus for producing fabrics in accordance with the present invention, is schematically depicted in FIG. 9. In this apparatus, the topographical support member is a rotatable drum 90. The drum rotates in a counterclockwise direction. Drum 90 may be a continuous cylindrical drum or may be made of a plurality of curved plates 91 disposed so as to form the outer surface of the drum. In either case, the outer surface of drum 90 or the outer surfaces of the curved plates 91 comprise the desired topographical support configuration. Disposed about a portion of the periphery of the drum is a manifold 89 connecting a plurality of orifice strips 92 for applying water or other fluid to a fibrous web 93 placed on the outside surface of the curved plates. Each orifice strip may comprise one or more rows of very fine diameter holes of approximately $5/1000$ of an inch to $10/1000$ of an inch in diameter. There may be as many as 50 or 60 holes per inch or more if desired. Water or other fluid is directed through the rows of orifices. The pressure in each orifice group is increased from the first group under which the fibrous web passes to the last group. The pressure is controlled by appropriate control valves 97 and monitored by pressure gauges 98. The drum is connected to a sump 94 on which a vacuum may be pulled to aid in removing water and to keep the area from flooding. In operation, the fibrous web 93 is placed on the upper surface of the topographical support member before the water ejecting manifold 89. The fibrous web passes underneath the orifice strips and is formed into a tricot-like nonwoven fabric. The formed fabric is then passed over a section 95 of the apparatus where there are no orifice strips, but vacuum is continued to be applied. The fabric after being de-watered is removed from the drum and passed around a series of dry cans 96 to dry the fabric.

Figure 10:
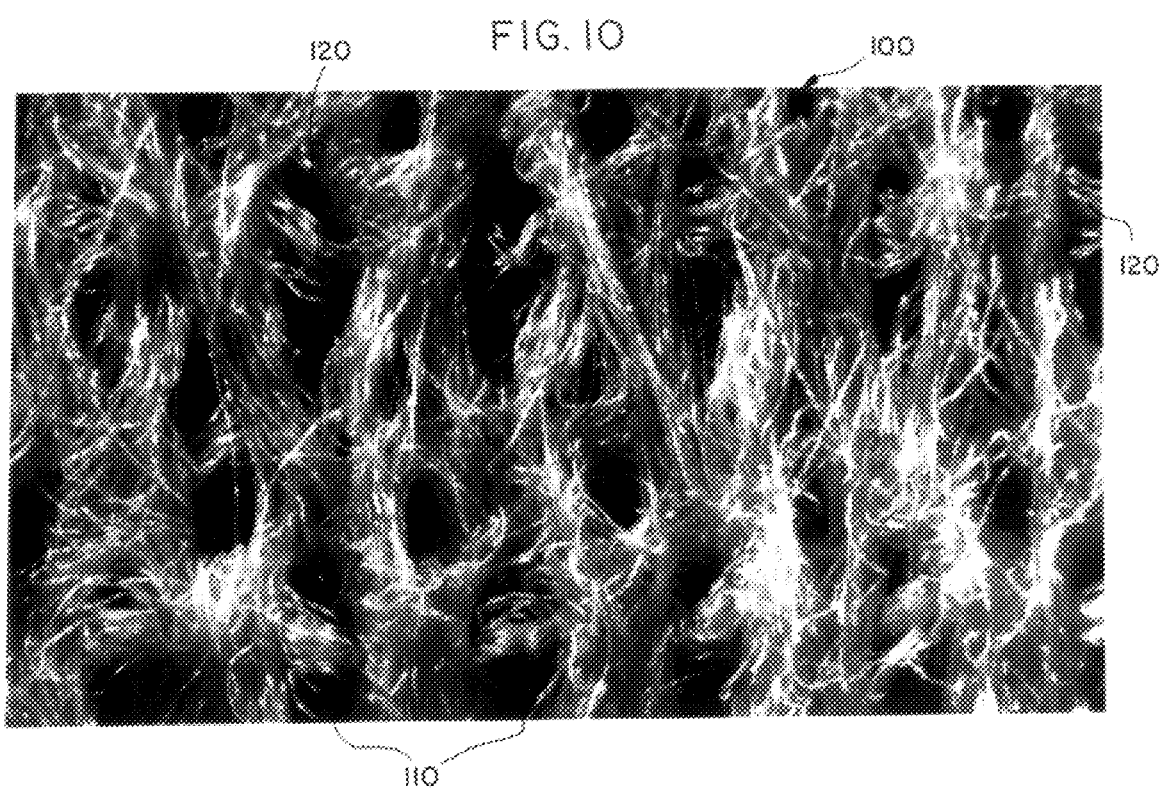
FIG. 10 is a photomicrograph of a tricot-like nonwoven fabric, enlarged about 20 times, as seen from its upper surface, formed using the topographical support member of FIG. 1.
Figure 11:
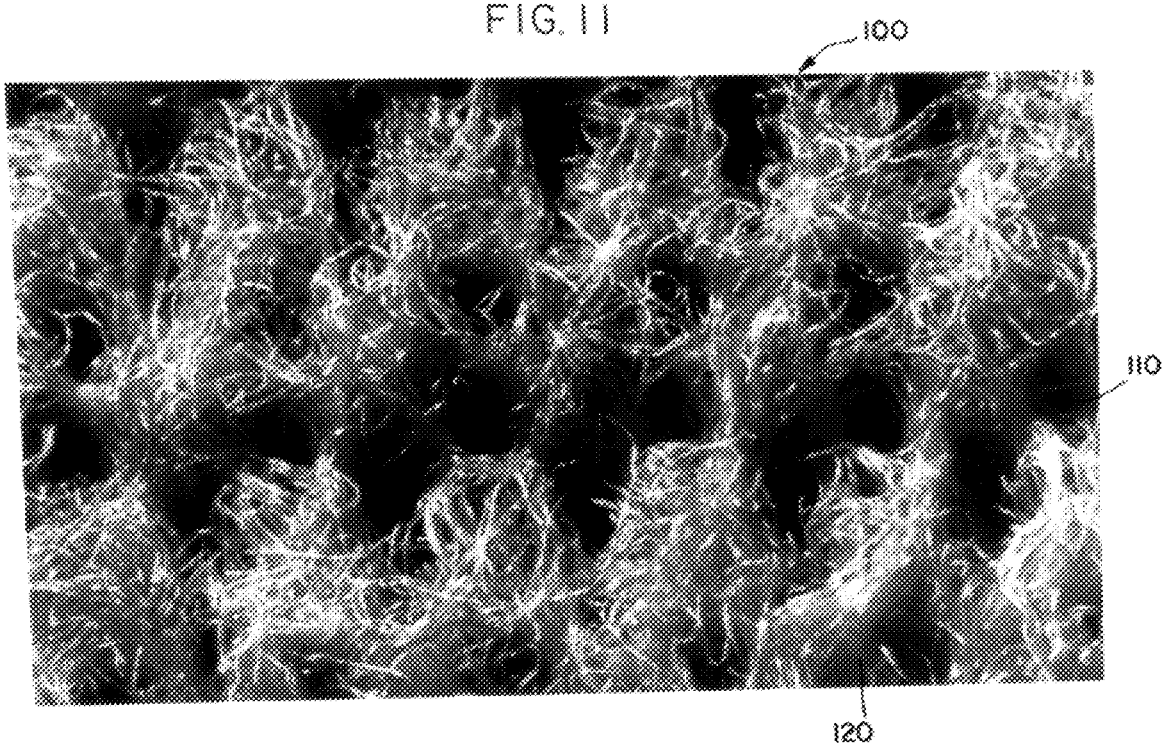
FIG. 11 is a photomicrograph of the tricot-like nonwoven fabric of FIG. 9 as seen from its bottom surface.

As noted above, the support member shown in FIG. 1 will produce a tricot-like nonwoven fabric. FIG. 10 is a copy of a photomicrograph of a tricot-like nonwoven fabric at an enlargement of approximately 20 times. The fabric 100 is made from a plurality of fibers. As seen in the photomicrograph, the fibers are intertwined and interentangled and form a pattern of openings 110 in the fabric. A number of these openings include a loop 120 formed from fiber segments. Each loop is made from a plurality of substantially parallel fiber segments. The loops are in the shape of a U with the closed end of the U pointed upwardly towards the upper surface of the fabric as viewed in the photomicrograph. FIG. 11 is a copy of a photomicrograph of the opposite, i.e. bottom, surface of fabric 100 of FIG. 10 at an enlargement of about 20 times. The fibers in the fabric are intertwined and entangled to form a pattern of openings 110 in the fabric. In some of these openings there are U-shaped loops 120 formed from substantially parallel fiber segments. When viewed from this bottom surface of the fabric, the open end of the U-shaped loop is pointed towards the surface of the fabric viewed in this photomicrograph.

EXAMPLE 1

A support member made of acetal with an average thickness of 6 mm was produced using the following parameters:

Focus Position=2.5 mm below material surface

Lens Type=Positive Meniscus

Lens Focal Length=5 inches

Laser Power=1300 watts

Surface Speed of Tube on Mandrel=20.3 m/min

Longitudinal Carriage Advance/Rev=0.05 mm

Pixel Size=0.05 mm

Figure 12:
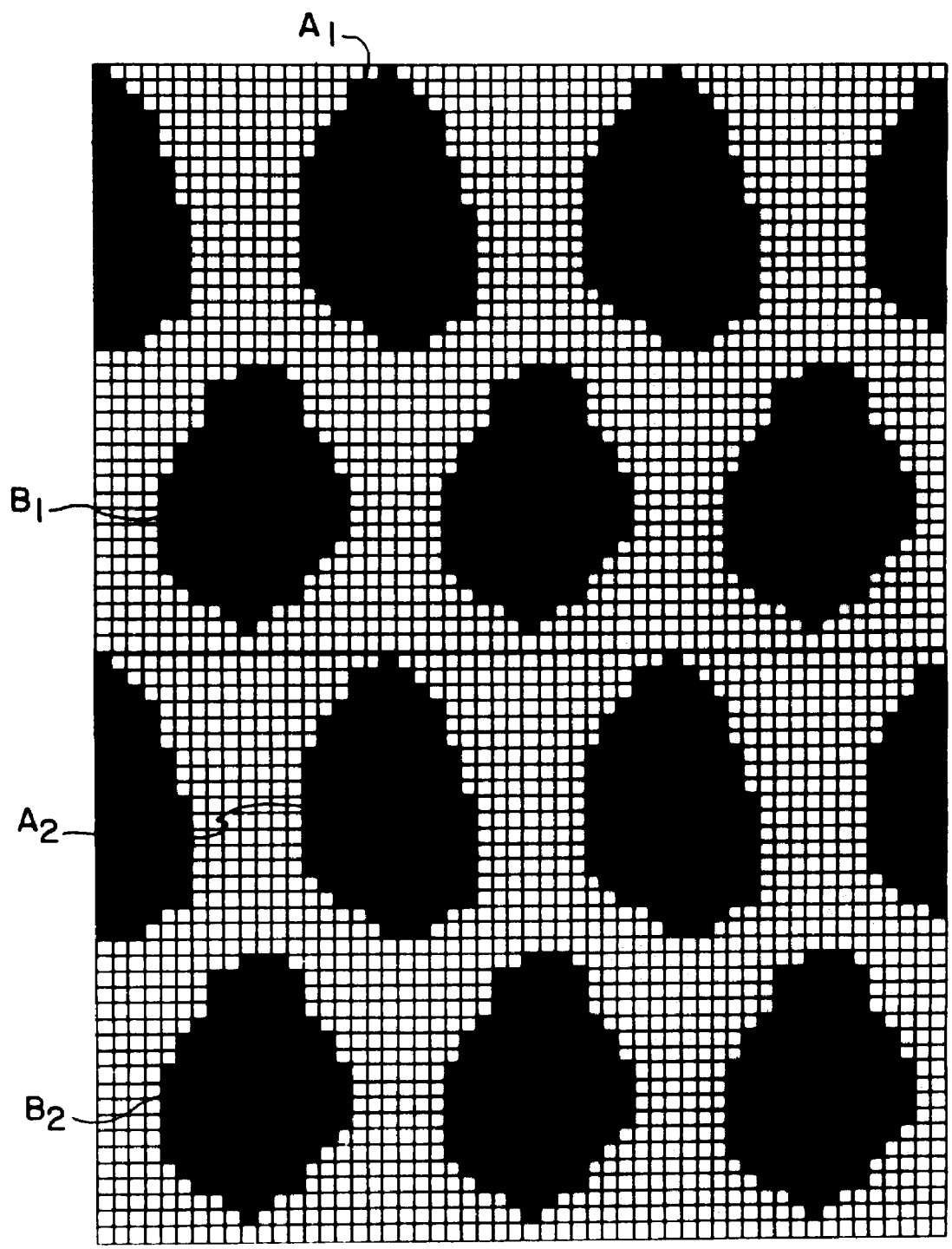
FIG. 12 is a bit map, similar to that depicted in FIG. 3, of a different set of laser instructions.

FIG. 12 is a pixel by pixel depiction of the on/off laser power pattern programmed into the computer control. The pattern consisted of repeating pairs of rows of apertures, labeled $A_1$, $B_1$, $A_2$, $B_2$, etc. The apertures in each A row have a first irregular shape and the apertures in each B row have a second irregular shape. A tubular workpiece approximately 3 feet in diameter, 12 feet long and 6 mm thick was laser drilled using the apparatus of FIG. 4 operated according to the instructions contained in FIG. 12 to provide the support member shown in FIGS. 13 and 14. The laser drilling process took about 7 days to complete.

In FIG. 13, the illustrated support member comprises a first row A of apertures (seen in the upper part of FIG. 13), a next adjacent row B of apertures and a second row A of apertures below row B of apertures. First row A of apertures includes aperture A'. Next adjacent row B of apertures includes aperture B' which is adjacent to aperture A'. The upper portion of aperture A' is surrounded and defined by peaks 501, 502, 503, 504, 505 and 506. The upper portion of aperture B' is surrounded and defined by peaks 510, 511, 512, 513, 504 and 503. It will be recognized that peaks 504 and 503 are common to both of apertures A' and B'. Line 521 (Double arrowhead) extending between peaks 501 and 504 constitutes the major diameter of the upper portion of aperture A', said major diameter being 0.085 inch in the support member being described. Similarly, line 522 extending between peaks 503 and 512 constitutes the major diameter of the upper portion of aperture B', said major diameter being 0.075 inch in the support member being described.

The various peak-to-peak distances associated with aperture A' in the support member being discussed are set forth in Table 1. The various peak-to-peak distances associated with aperture B' in the support member are set forth in Table II.

TABLE I (Dimensions in inches)

| PEAK No. | 501 | 502 | 503 | 504 | 505 |
|---|---|---|---|---|---|
| 501 | — | — | — | — | — |
| 502 | 0.037 | — | — | — | — |
| 503 | 0.067 | 0.040 | — | — | — |
| 504 | 0.085 | 0.067 | 0.037 | — | — |
| 505 | 0.070 | 0.075 | 0.055 | 0.035 | — |
| 506 | 0.035 | 0.056 | 0.065 | 0.065 | 0.040 |

TABLE II (Dimensions in inches)

| PEAK No. | 510 | 511 | 512 | 513 | 503 |
|---|---|---|---|---|---|
| 510 | — | — | — | — | — |
| 511 | 0.037 | — | — | — | — |
| 512 | 0.062 | 0.035 | — | — | — |
| 513 | 0.065 | 0.056 | 0.037 | — | — |
| 503 | 0.035 | 0.066 | 0.075 | 0.063 | — |
| 504 | 0.055 | 0.067 | 0.055 | 0.037 | 0.037 |

Figure 14:
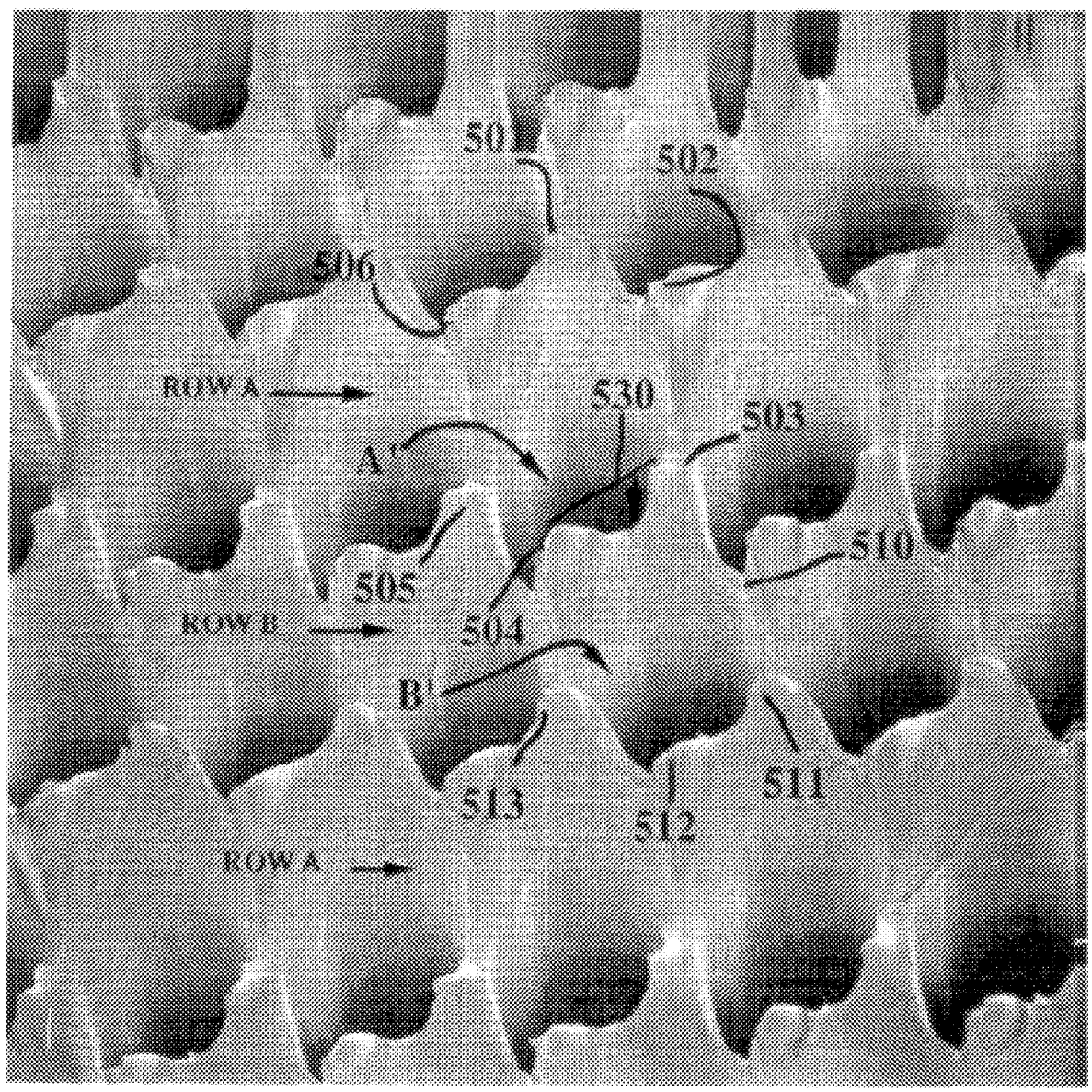
FIG. 14 is another digitized image of the support member shown in FIG. 13.

FIG. 14 is the same digitized image as that shown in FIG. 13 but it has been marked and numbered to show the distance between the bottom of a valley between two adjacent peaks and a line connecting the same two peaks. For example, line 530 in FIG. 14 connects peaks 503 and 504 associated with aperture A'. The depths of the valleys between peaks 501–506 associated with aperture A' are shown in the upper portion of Table III. The depths of the 2 valleys associated with aperture B', i.e. the valleys between peaks 510 and 511 and the valley between peaks 504 and 513, are shown in the lower portion of Table III. The valleys between the remaining peaks associated with aperture B', those between peaks 511 and 512, and between 512 and 513, are structurally analogous Table III to those valleys between peaks 501 and 506, and 501 and 502 respectively.

TABLE III

| Valley Between Peaks | Valley Depth Inches |
|---|---|
| 501 and 502 | 0.016 |
| 502 and 503 | 0.020 |
| 503 and 504 | 0.024 |
| 504 and 505 | 0.025 |
| 505 and 506 | 0.020 |
| 506 and 501 | 0.012 |
| 510 and 511 | 0.026 |
| 504 and 513 | 0.026 |

While several embodiments and variations of the present invention are described in detail herein, it should be apparent that the disclosure and teachings of the present invention will suggest many alternative designs to those skilled in the art.

What is claimed is:

1. A topographical support member for producing nonwoven fabrics comprising:

a body having a top surface comprising a pattern of a plurality of peaks and valleys and a plurality of apertures, each of said apertures having a conical top portion surrounded by a cluster of said peaks and valleys.

2. The support member of claim 1 wherein each aperture is surrounded by a cluster of six peaks and six valleys.

3. The support member of claim 1 wherein the center line to center line spacing of adjacent apertures is less than the major diameter of the conical top portion of each adjacent aperture.

4. The support member of claim 1 wherein said pattern of the plurality of peaks, valleys and apertures being configured to produce a nonwoven fabric with the appearance of tricot.

* * * * *